(12) United States Patent
Beisiegel et al.

(10) Patent No.: US 7,490,331 B2
(45) Date of Patent: Feb. 10, 2009

(54) MAPPING TO AND FROM NATIVE TYPE FORMATS

(75) Inventors: Michael Beisiegel, Poughkeepsie, NY (US); Harold Jeffrey Gartner, Thornhill (CA); John Henry Green, Toronto (CA); Piotr Przybylski, Brooklin (CA)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 10/378,995

(22) Filed: Mar. 4, 2003

(65) Prior Publication Data
US 2004/0177360 A1   Sep. 9, 2004

(51) Int. Cl.
*G06F 13/00* (2006.01)

(52) U.S. Cl. .................. 719/313; 707/100; 717/106

(58) Field of Classification Search ............. 719/313; 707/100; 717/106
See application file for complete search history.

(56) References Cited

U.S. PATENT DOCUMENTS

| 6,523,027 | B1 | 2/2003 | Underwood | |
| 7,020,869 | B2* | 3/2006 | Abrari et al. | 717/108 |
| 7,089,584 | B1* | 8/2006 | Sharma | 726/4 |
| 7,127,700 | B2* | 10/2006 | Large | 717/100 |
| 7,152,090 | B2* | 12/2006 | Amirisetty et al. | 709/200 |
| 7,158,990 | B1* | 1/2007 | Guo et al. | 707/102 |
| 2002/0091974 | A1 | 7/2002 | Szydlowski | |
| 2003/0023957 | A1* | 1/2003 | Bau et al. | 717/140 |
| 2004/0015832 | A1* | 1/2004 | Stapp et al. | 717/106 |
| 2005/0021689 | A1* | 1/2005 | Marvin et al. | 709/220 |
| 2006/0294500 | A1* | 12/2006 | Chiang | 717/109 |

FOREIGN PATENT DOCUMENTS

WO    0138976 A1    5/2001

* cited by examiner

*Primary Examiner*—Andy Ho
(74) *Attorney, Agent, or Firm*—Jeanine Ray-Yarletts, Esq.; Steven M. Greenberg, Esq.; Carey Rodriguez Greenberg & Paul LLP

(57) ABSTRACT

In one aspect of the present invention a framework is presented for the generation and execution of code performing conversion to and from an arbitrary native or "wire" data format. The code facilitates a business application using a service provided by a service implementation in accordance with a native language of the implementation which may be different from the language of the business application. The main components of the framework include a model of the information necessary for the formatting of data which may be represented through the extensions to WSDL; a tool time support environment providing structured support for the generation of format handlers; and runtime support for the generated format handlers. In an alternative to this static invocation model, a dynamic usage scenario provides for invocation of format handlers dynamically obtained from a format handler factory. In both cases, the runtime uses a lazy approach to the conversion to and from the native format for improved performance. The framework is particularly suited to resource adapters for adapting an EIS service implementation for use with a business application desiring a service from the EIS.

30 Claims, 12 Drawing Sheets

MAPPING TO AND FROM NATIVE TYPE FORMATS

FIELD OF THE INVENTION

The present invention relates to application development and operation and, more particularly, to integrating an application component that maps data to and from a native type format.

BACKGROUND OF THE INVENTION

As a result of the widespread use and development of electronic commerce (e-commerce, whereby transactions for a variety of goods and services are conducted electronically) and electronic business (e-business, whereby business processes—e.g., shipping, procurement, staffing, etc.—are transformed so as to be conducted electronically), business and enterprise applications have been, and continue to be, developed to interact with numerous back end systems to access and store information related to an e-business or e-commerce transaction. Back end systems (sometimes referred to as Enterprise Information Systems—EISs) include systems related to: parts procurement, receiving, manufacturing or Enterprise Resource Planning (ERP) systems, shipping, accounting and many others.

One commonly used approached to developing business and enterprise applications, particularly those involving a multitiered architecture, is to develop in accordance with the Java™ 2 Platform, Enterprise Edition (J2EE) standard of Sun Microsystems, Inc. Java and all Java—based trademarks are trademarks or registered trademarks of Sun Microsystems, Inc. Multitiered architectures divide an enterprise application into a plurality of computing environments or tiers, typically involving at least three computer platforms in a client/server paradigm. In addition to a client-side platform hosting a client application, the server-side of the architecture environment often involves a server-side presentation platform, such as a web server, a server-side business logic platform, such as an application server and, for those enterprise applications requiring EIS services, a back end connected EIS platform.

J2EE is intended to simplify enterprise applications and their development by basing the applications on standardized, modular components. J2EE further provides a complete set of services to those components, and handles automatically many details of application behavior to avoid complex programming. J2EE extends many features of the Java 2 Platform, Standard Edition for Java based applications. J2EE adds full support for Enterprise Java Beans (EJBs) components to capture business logic and Java Servlets API and Java Server Pages (JSPs) for presentation and communication between the server-side and client-side. Support for Extensible Markup Language (XML) technology is also provided in the J2EE standard.

Multitier applications that require the integration of a variety of resources including legacy data and code as well as programmer skill-sets are difficult to design. It is reported that integrating these resources can take up to 50% of application development time. The J2EE standard wraps and embraces existing resources required by multitier applications with a unified, component-based application model and enables co-operating components, tools, systems, and applications for solving the strategic requirements of an enterprise.

The integration of EIS services to a Java-based model for business applications is the subject of much research and development. Many EISs were often not created to interact easily with other systems (i.e., these legacy EISs were often stand alone systems). EISs are typically not developed in accordance with Java standards. The software for such EISs is typically written in other native programming languages, such as Common Business Oriented Language (COBOL), having their own respective native data types. Thus during development and operation of an integrated application, there is a need for a manner of mapping Java types to native types.

To address the complexity in developing a business application incorporating an EIS, resource adapters have been developed which ease the difficulty. The resource adapter (also sometimes referred to as a "connector") acts as an intermediary or broker between an EIS and a business application requiring the services of the EIS. A resource adapter architecture generally defines a set of services available from an EIS to allow developers to quickly connect and integrate their business applications. Resource adapters typically are supplied by the developer of the EIS. A resource adapter (or connector) appears as a component (or library) specific to an EIS that provides connectivity to the EIS. It is possible to conceptualize the resource adapter's function as analogous to a Java™ Database Connector (JDBC) driver—a programming interface that lets Java applications access data in a relational database.

Without the use of resource adapters, business application developers often do not fully appreciate the complexities involved in leveraging established enterprise applications and end up spending too much time understanding and coding directly to each particular EIS's integration APIs (if APIs are even available). As note, one particular area requiring understanding and programming involves mapping or converting between data types used by the EIS and the data types available to the business application. The hand-coded logic developed for this and other areas often provides narrow opportunities for reuse, because it is application-specific by design.

However, resource adapters are not without their own problems. Firstly, each resource adapter is typically specific to a single EIS. As such, for "n" number of EISs, "n" resource adapters need to be created. This is often not too problematic in isolation. However, the ETS-specific nature of a resource adapter is coupled with the fact that the resource adapters, which are used at runtime (i.e., during execution of a business application), require adapter tools to be created (typically by the manufacturer or provider of the resource adapter) that are used by an Integrated Development Environment (IDE) to create a business application that can utilize the corresponding resource adapter. As such, a resource adapter is not only specific to the EIS with which it is designed to interact, but the tooling which corresponds to the resource adapter is also specific to an IDE. As a result, if tooling is to be created for "m" number of IDEs, "m" adapter tools will also need to be created. Therefore, for a provider of resource adapter—tool sets to provide resource adapter—tool sets for "n" number of EISs and "m" number of IDEs will require the creation of "m"×"n" resource adapter-tool sets to be created. This is an extremely time consuming and costly undertaking. As such, developers of business applications are typically limited to using an adapter-tool set from the EIS supplier and, possibly, using an IDE that the developer typically does not use as their normal or preferred IDE is not supported by the adapter-tool set.

As such, a solution which addresses some or all of these shortcomings is desired.

SUMMARY OF THE INVENTION

The present invention is directed to application components that map data to and from a native type format.

In one aspect of the present invention a framework is presented for the generation and execution of code performing conversion to and from an arbitrary native or "wire" data format. The code facilitates a business application using a service provided by a service implementation in accordance with a native language of the implementation which may be different from the language of the business application. The main components of the framework include a model of the information necessary for the formatting of data which may be represented through the extensions to WSDL; a tool time support environment providing structured support for the generation of format handlers; and runtime support for the generated format handlers. In an alternative to this static invocation model, a dynamic usage scenario provides for invocation of format handlers dynamically obtained from a format handler factory. In both cases, the runtime uses a lazy approach to the conversion to and from the native format for improved performance. The framework is particularly suited to resource adapters for adapting an EIS service implementation for use with a business application desiring a service from the EIS.

In accordance with an aspect of the present invention there is provided a method for generating code for a business application where the code is adapted to access a service provided by a service implementation created from code in a native language. The method comprises receiving data describing the service and service implementation, said data describing one or more messages associated with said service and information to identify one or more native data types of said service implementation implementing said messages; mapping said data describing said messages to corresponding native data types of said implementation; and generating code of said business application, said code implementing said mapping. In accordance with this method aspect, generating code may comprises generating Java code defining each of said messages for manipulating said messages without regard for the native data types of said implementation. Further, generating code may comprise or additionally comprise generating a respective format handler for each of said messages, each said format handler for, at least one of, converting a respective message to and converting a respective message from said corresponding native data types. Generating a format handler may comprise naming the format handler in accordance with a naming convention to facilitate location of said format handler when said business application is executing.

In accordance with the method aspect, data describing the service and implementation may comprise Extensible Markup Language (XML) data which may conform to the Web Services Definition Language (WSDL) standard. Further, such XML data may be provided in at least one document.

In accordance with a feature of the method aspect receiving data describing said service and implementation may comprise querying a resource and tooling adapter for said data describing said service and implementation; and responsive to said querying, receiving said data describing said service and implementation. The resource and tooling adapter may include a connector and a document comprising the data describing the service and implementation, and for example, the connector may be one of a Java 2, Enterprise Edition (J2EE) Connector Architecture connector; and a Common Connector Framework (CCF) connector.

In accordance with a further feature, the steps of receiving, mapping and generating can be performed dynamically, during the execution of said business application.

In accordance with another aspect of the invention, there is provided a resource adapter comprising: a first mechanism providing a description of a service provided by an enterprise information system (EIS), the description comprising an abstract definition of the service and binding elements for the abstract definition sufficient to invoke said service, said binding elements comprising a format binding providing a relationship between at least one message of the service and at least one corresponding native data type of the EIS; a second mechanism for invoking said service described, said mechanism mapping said messages to and from corresponding native data types of said implementation; said resource adapter adapted to communicate with an integrated development environment to assist in development of a business application; and said resource adapter further adapted to communicate with a business application during execution of said business application.

There is provided, in accordance with a further aspect of the invention, an integrated development environment (IDE) for generating a business application, said business application, when executed, uses a service provided by a service implementation. The IDE comprises an interface for determining data describing said service and service implementation, said data describing one or more messages associated with said service and information to identify one or more native data types implementing said messages; and a generator generating code for said business application to access said service, said code mapping said data describing said messages to corresponding native data types of said implementation.

In accordance with a further aspect of the invention, there is provided a computer readable media storing data and instructions readable by a computer system, said computer system executing an integrated development environment (IDE) for generating a business application to access a service provided by a service implementation. The said data and instructions of the computer readable media, when deployed on said computer system, adapts said IDE to determine data describing said service and service implementation, said data describing one or more messages associated with said service and information to identify one or more native data types implementing said messages; and using said data, generate code for said business application to access said service, said code mapping said data describing said messages to corresponding native data types of said service implementation.

There is also provided, in accordance with yet another aspect of the invention, a business application, embodied in a computer usable medium, for accessing a service provided by a service implementation, said service and service implementation having a definition providing data describing one or more messages associated with said service and information to identify one or more native data types implementing said messages, said business application comprising: code for said business application to access said service, said code mapping said data describing said messages to corresponding native data types of said service implementation and said code generated in response to said definition.

There is further provided a method for generating components of a business application which accesses a service provided by a service implementation in accordance with a definition, the method comprising: receiving a service interface definition providing an abstract description including at least one abstract data type for a service to be provided by the business application; receiving a service implementation definition providing a description and location of an implementation of the service, said service implementation definition comprising format bindings providing a relationship between the at least one abstract data type and at least one corresponding native data type of the implementation; generating code to provide a representation of the at least one abstract data type for manipulating without regard to a respective native type implementing the abstract type; and generating a format handler in response to said format bindings to map said representation to said native types.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
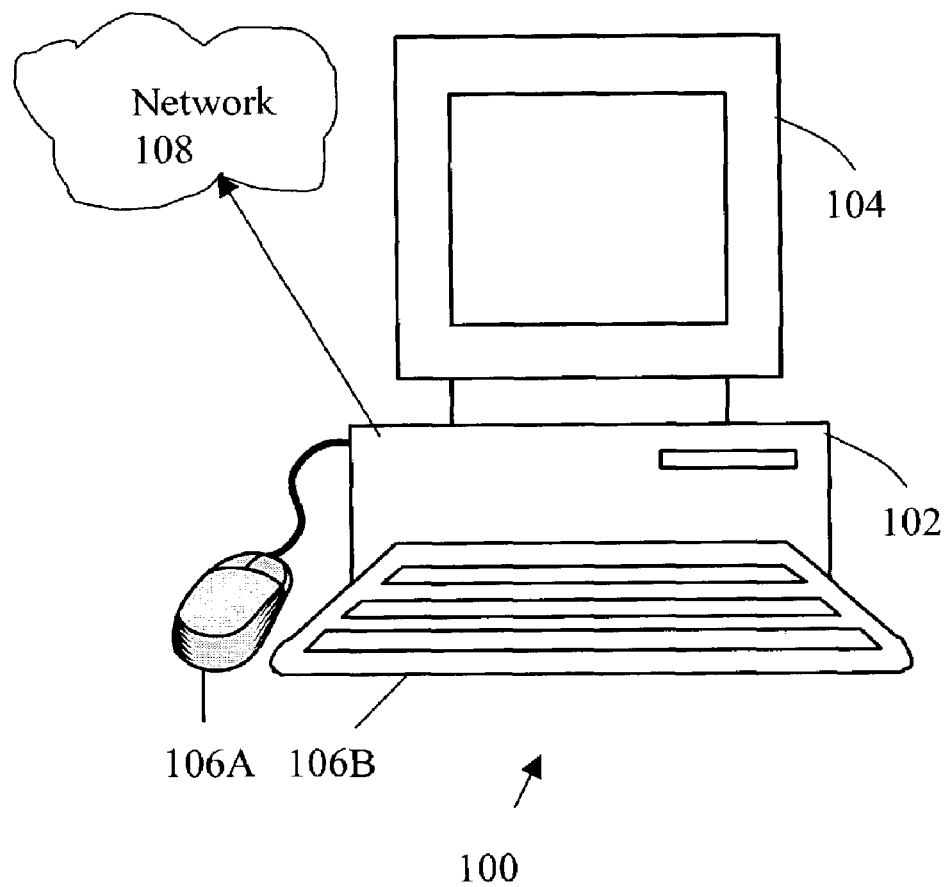
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100.

Computer system 100 includes processing system 102 which communicates with various input devices 104, output devices 106 and network 110. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/0 devices include removable and fixed recordable media (e.g., floppy disk drives, tape drives, CD-ROM drives, DVD-RW drives, etc.), touch screen displays and the like.

Figure 2:
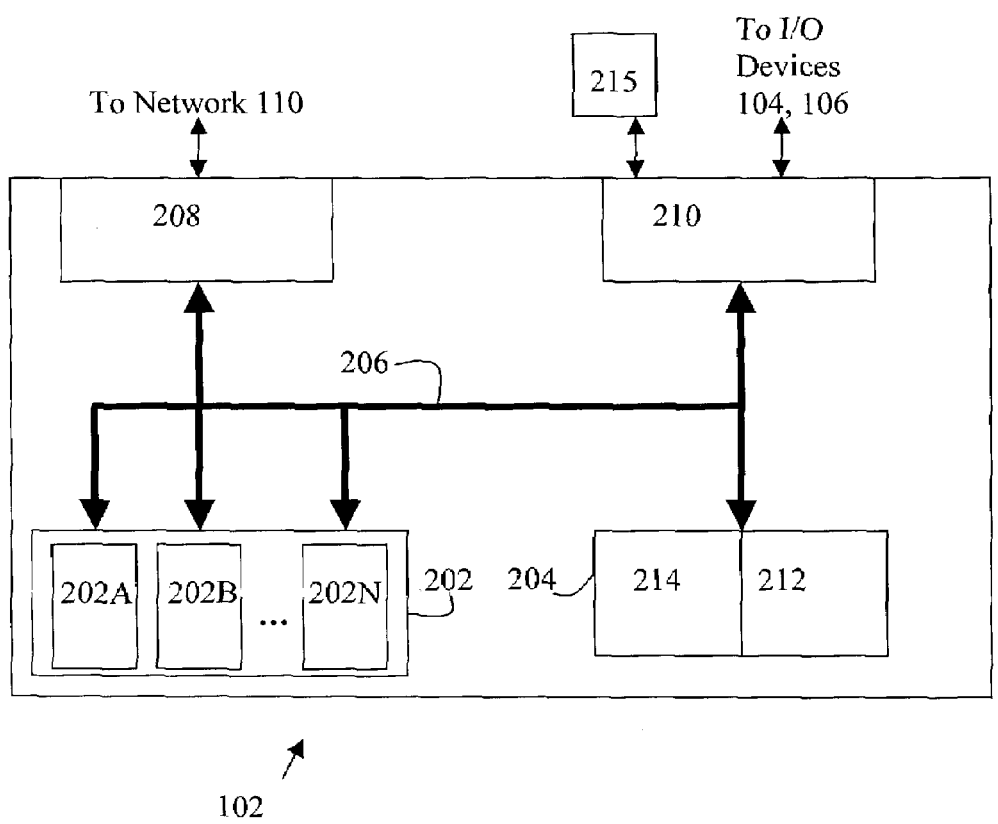
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 110. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 110.

I/O I/F 210 enables communication between processing system 102 and the various I/O devices 104, 106. I/0 I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 as a removable data storage device.

Figure 3:
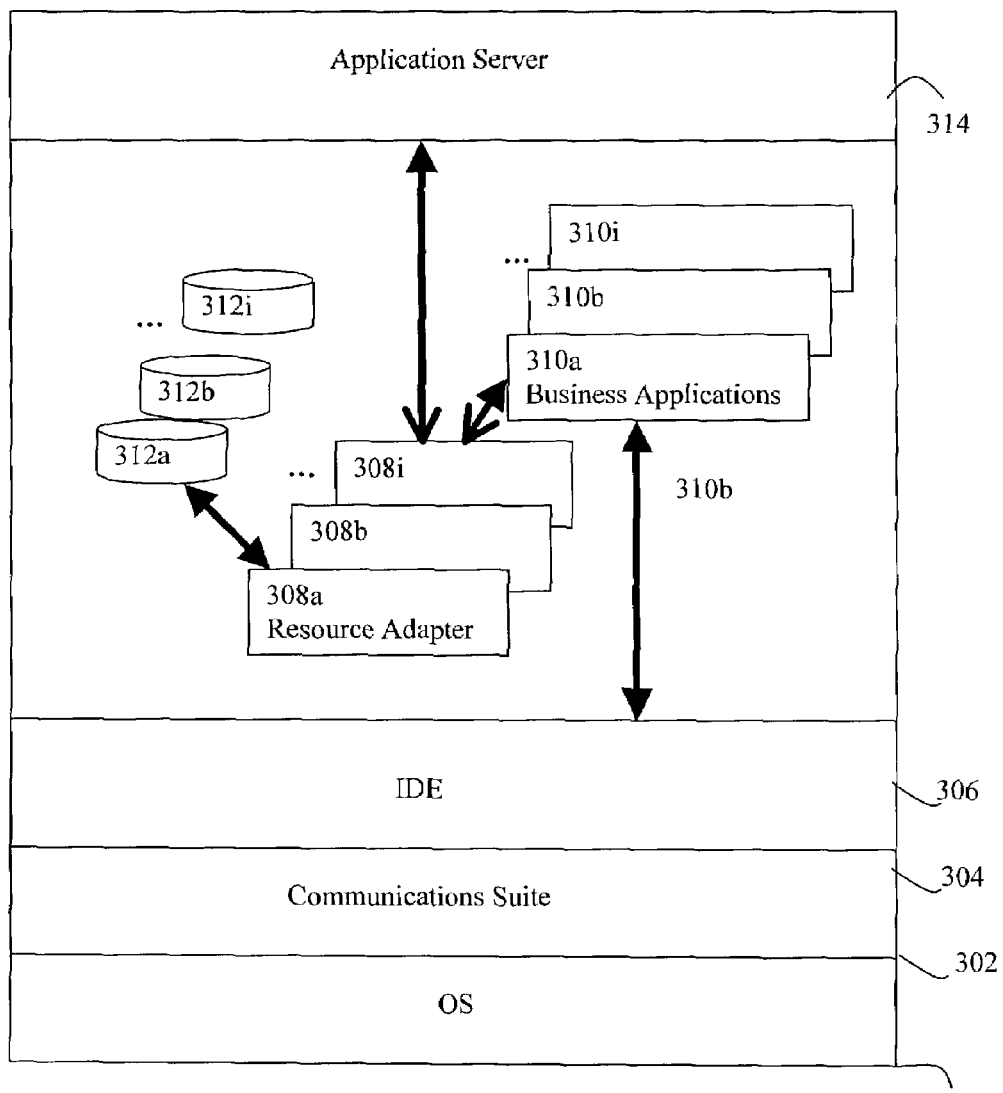
FIG. 3 illustrates, in functional block form, a portion of the memory illustrated in FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 204 stores operating system (OS) 302, communications suite 304, IDE 306, resource adapters 308a, 308b, . . . , 308i, business applications 310a, 310b, . . . , 310i, EISs 312a, 312b, . . . , 312i and application server 314. Persons of ordinary skill in the will appreciate that very seldom will application server 314 and IDE 306 reside in memory 204 at the same time. During tool time, application server 314 is optional and during runtime IDE 306 is optional with resource adapters 308 and business applications 310 considered to be part of application server 314.

OS 302 is an operating system suitable for operation with a selected CPU 202 and the operations described herein. Multitasking, multithreaded OSes such as, for example, IBM AIX™, Microsoft Windows NT™, Linux™ or the like, are expected in many embodiments to be preferred.

Communication suite 304 provides, through, interaction with OS 302 and network I/F 208 (FIG. 2), suitable communication protocols to enable communication with other networked computing devices via network 110 (FIG. 1). Communication suite 304 may include one or more of such protocols such as TCP/IP, Ethernet, token ring and the like.

Also stored in memory 204 (and used during the development process) and incorporating aspects of the present invention is Integrated Development Environment (IDE) 306. In the exemplary embodiment, IDE 306 provides a developer (or a team of developers) a development environment using a graphical user interface (GUI) known to those skilled in the art. The GUI typically includes a number of windows or panes for viewing source code, project files, debugging information or the like. Unlike conventional IDEs, IDE 306 is adapted to have one or more resource tooling adapters (RTAs) 308 (described in detail below) "plugged in". That is, IDE 306 is adapted to communicate with one or more RTAS 308 serially or simultaneously. Through communication with RTAS 308, IDE 306 is able to assist developers in developing a business application 310 which is designed to use the services provided by one or more selected EISs 312. The operation of IDE 306 and its interaction with a RTA 308 and a business application 310 is better understood with reference to FIGS. 5 and 8 described below.

RTAs 308a, 308b, . . . , 308i (collectively RTAS 308), during the development process of a business application 310, communicate with, or plug into, IDE 306. Each RTA 308 corresponds to a selected EIS 312. That is, each RTA 308 in the exemplary embodiment is specific to a particular EIS 312. The RTAs (resource and tooling adapters) embody a new type of resource adapter that may be employed during both development of a business application and runtime (i.e., execution) of the business application.

It should be noted that, in alternative embodiments, a single RTA 308 could be employed to communicate (either serially or simultaneously) with more than one EIS 312. This may be particularly advantageous if there exists a high degree of similarity between the more than one EISs 312.

The RTAs in the exemplary embodiment are adapted from the Java 2, Enterprise Edition (J2EE) Connector Architecture. The J2EE Connector architecture, some aspects of which are described below, is described in greater detail in the document entitled "J2EE8 Connector Architecture Specification", JSR 016, Version 1.0, Final Release, released Aug. 22, 2001 from Sun Microsystems, Inc. of Palo Alto, Calif., the contents of which are hereby incorporated herein by reference.

Through communication with IDE 306, a RTA 308 will, responsive to a request, provide data describing the services which are available from an EIS 312 (e.g., database facilities, transaction facilities, business services, etc.). In addition to communicated services, a RTA 308 provides data to IDE 306 which details how to invoke a service (e.g., the parameters to use, the location of a service and the like). In the exemplary embodiment, the operations and functionality of a J2EE connector is extended by a Web Services Description Language (WSDL) document. The J2EE Connector Architecture provides a standard client programming model for accessing EIS services. However, as will be appreciated by those of ordinary skill in the art, other connector architectures, such as the Common Connector Framework (CCF) from International Business Machines Corporation, which are designed to be used by applications during runtime to communicate with back end system could equally be employed.

WSDL provides a standard way for describing which services are offered by a specific EIS instance, and how you access them. WSDL, in XML format, describes network services as a set of endpoints operating on messages containing either document-oriented or procedure-oriented information. The operations and messages are described abstractly and then bound to a concrete network protocol and message format to define an endpoint. Related concrete endpoints are combined into abstract endpoints (services). WSDL is extensible to allow description of endpoints and their messages regardless of what message formats or network protocols are used to communicate. WSDL can be better understood with reference to the World Wide Web Consortium (W3C) document entitled "Web Services Description Language (WSDL) 1.1" dated Mar. 15, 2001 the contents of which are hereby incorporated herein by reference. While the exemplary embodiment described herein utilizes WSDL, other languages which describe services could also be employed. As will be appreciated by those of ordinary skill in the art, other languages to describe the services of an EIS and how to invoke those services could equally be employed. For example, it is contemplated that the Electronic Business XML (ebXML) language promulgated, in part, by the United Nations Centre for Trade Facilitation and Electronic Business (UN/CEFACT) could, alternatively, be employed.

A document from the Sun Microsystems, Inc. (Java Community Process group) of Palo Alto, Calif. entitled JSR 10"Java APIs for WSDL" describes a proposed standard set of APIs for representing and manipulating services described by WSDL documents. These APIs define a way to construct and manipulate models of service descriptions. The contents of "Java APIs for WSDL" is hereby incorporated herein by reference.

Figure 4A:
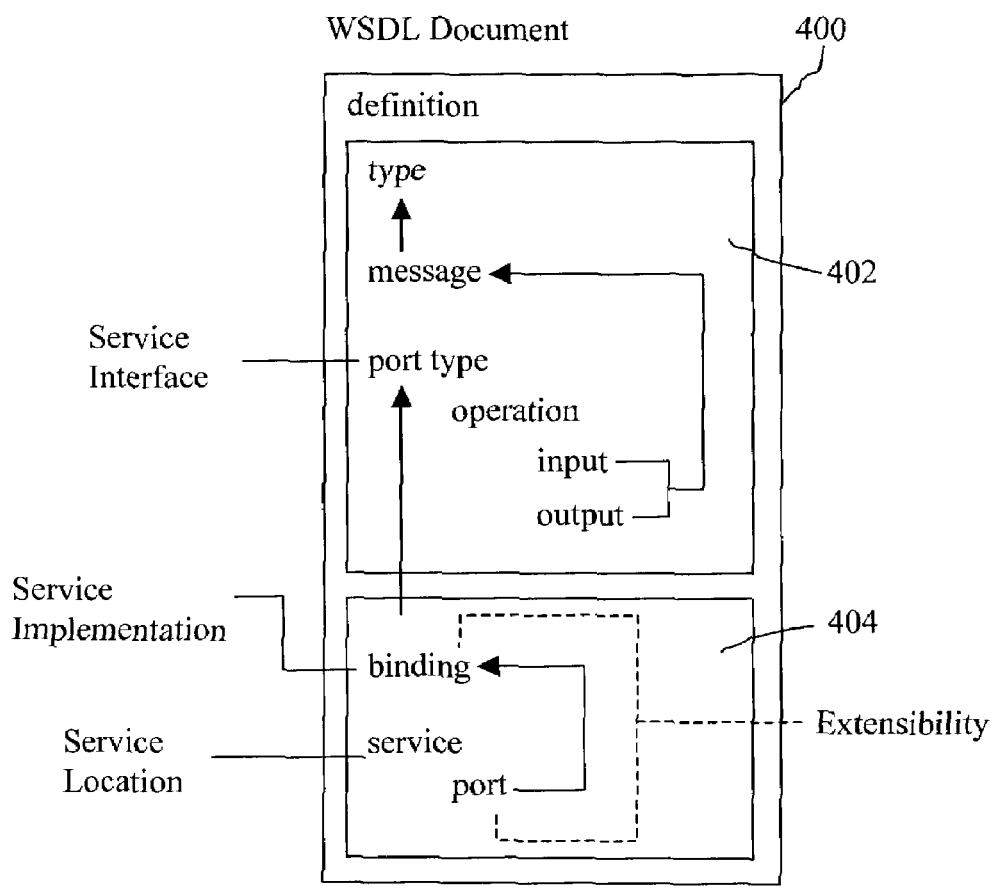
FIGS. 4a and 4b illustrate respectively, a form of WSDL document in accordance with the proposed WSDL standard and an exemplary WSDL document incorporating an aspects of the present invention.
Figure 4B:
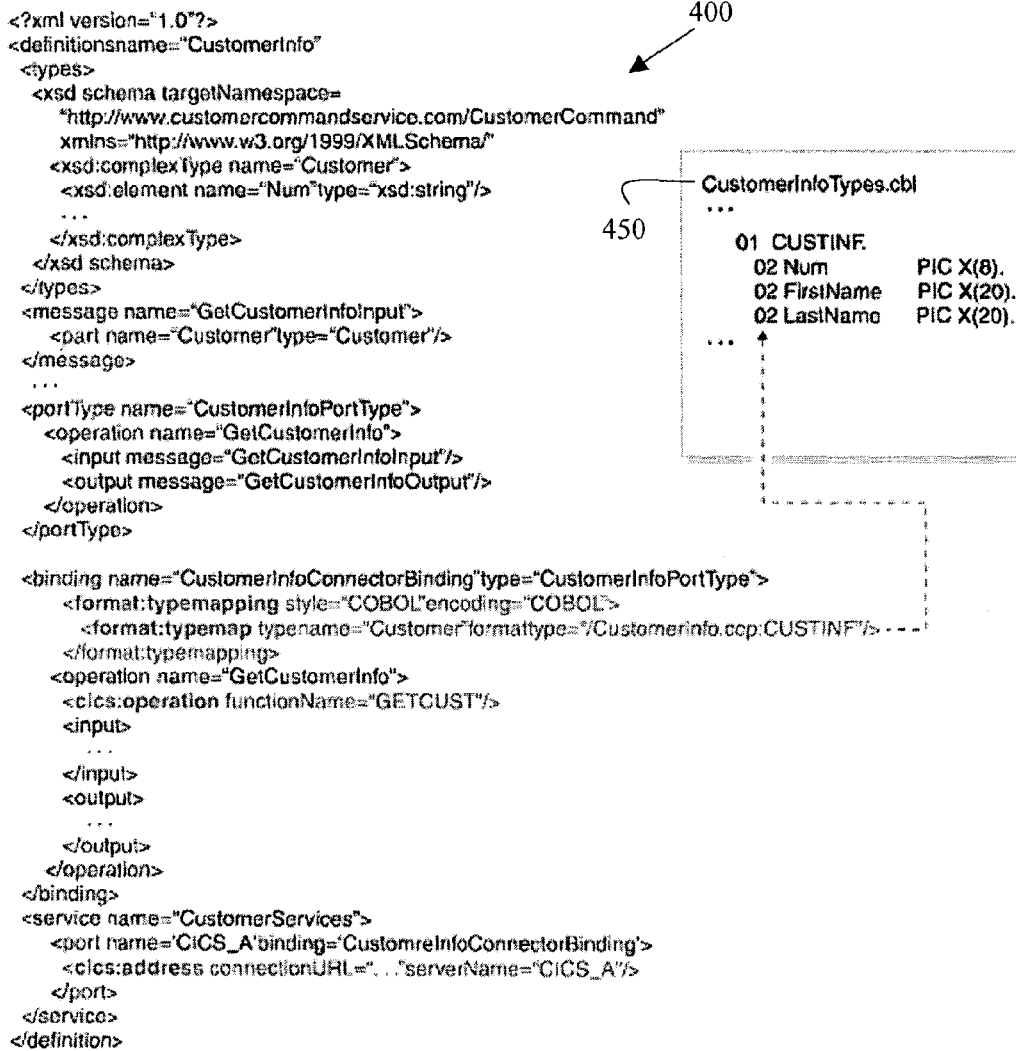

FIGS. 4a and 4b illustrate respectively the general structure of a WSDL document 400 and an exemplary WSDL document 450 incorporating an aspect of the present invention. FIG. 4a illustrates WSDL document architecture 400 comprising two primary aspects: an abstract service interface definition section 402 and service implementation and location definition section 404. The service interface in WSDL is called a portType 406. PortType 406 consists of one or more operations 408 with input 410 and output 412. Input 410 and output 412 are described by service messages typed using XML Schema definitions (XSD) to describe the business data that flows in and out of the services.

Exemplary document 450 illustrates an example of a service interface to a Customer Information service (portType name="CustomerInfoPortType"). The service includes a GetCustomerInfo operation with an input message "GetCustomerInfoInput". This message is defined to comprise a part "Customer" of type "Customer". The type "Customer" is typed using XSD and comprises a complex type with elements.

Service implementation and location definition 404 (FIG. 4A) provides data on how to interact with the service specified by the service interface and the location of the specific service. This definition which forms part of a RTA 308 is described in greater detail below with reference to FIG. 7 and is hereinafter referred to as the "extensibility elements". Exemplary document 450 illustrates an example of a service implementation and location definition for a connector to a CICS based EIS having native COBOL data types, including CustomerInfoTypes.cbl 452 comprising CUSTINFO described further herein below.

RTAs 308 also communicate with business applications 310 (during runtime), EISs 312 (during runtime and, in an one embodiment—the exemplary embodiment—of the present invention, also during the development process) and application server 314. The communication between RTAS 308 and the other components of computer system 100 (illustrated as forming part of memory 204 in FIG. 3) is best understood with reference to FIGS. 5-10, described below.

EISs 312 (which include individual EIS 312a, 312b, . . . 312i ) are conventional enterprise information systems. These may include, for example, databases for human resource data, inventory data and the like, ERPs, transaction processing systems, etc. Any type of EIS 312 which may be used to facilitate an e-commerce or e-business transaction may be employed.

A business application 310 (a plurality of business applications, 310a, 310b, . . . , 310i are illustrated in FIG. 3), which may or may not have been developed by IDE 306, employs or uses the services of one or more EISs 312 through communication with RTAS 308 during runtime. An IDE is used to develop a business application 310 to use and employ the services of an EIS 312. In the exemplary embodiment the information required by the IDE to use the services for an EIS 312 is obtained from data describing the services available and how to invoke or use these services from a RTA 308.

Application server 314 is a conventional application server that hosts or connects to, during runtime, one or more RTAS 308. An application server 314 assists in the communication between an EIS 312 and a business application 310 (through RTA 308) that is attempting to utilize the services provided by the EIS 312.

Figure 5:
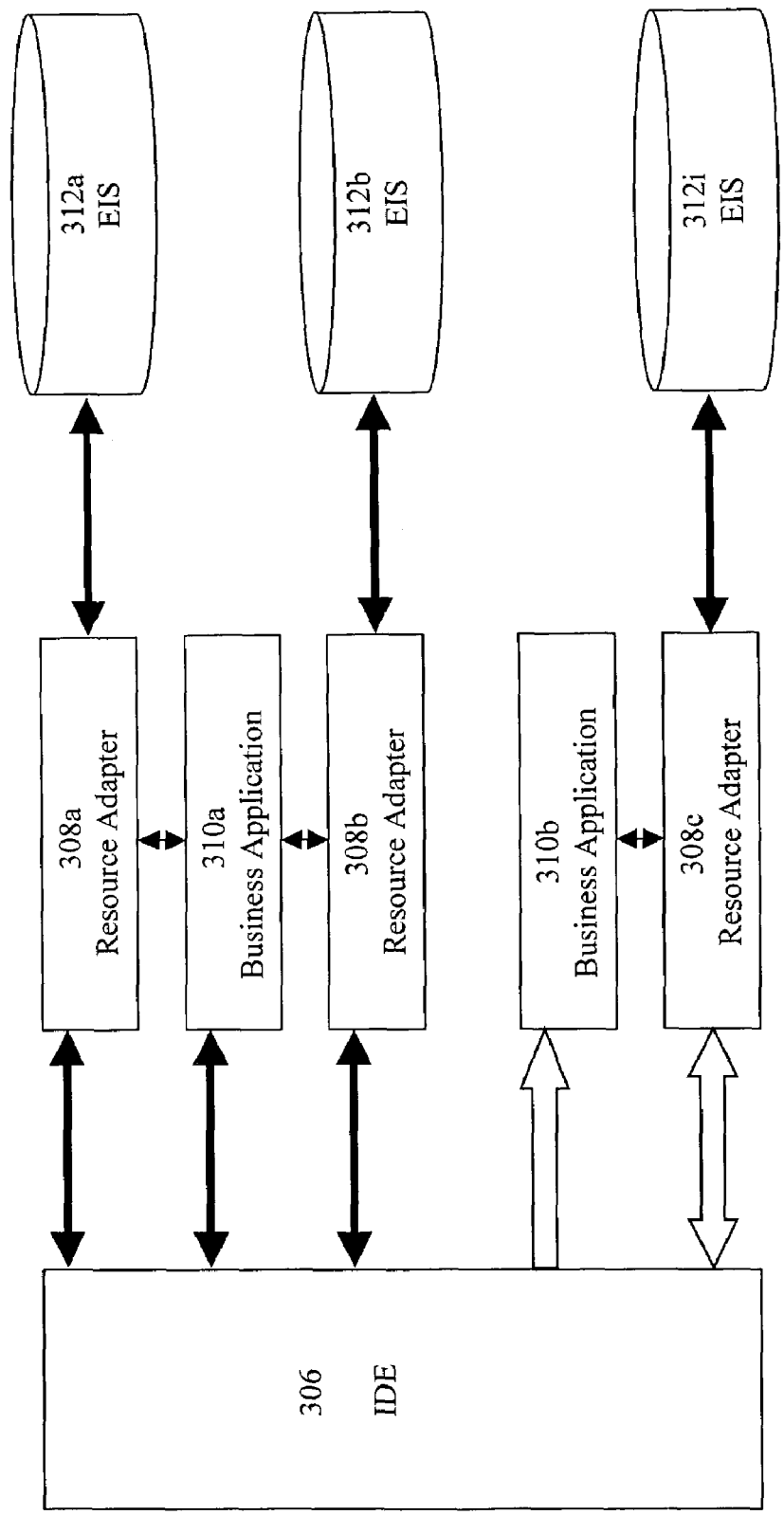
FIG. 5 illustrates a first interaction of some of the components of FIG. 2 during the development of a plurality of business applications.
Figure 6:
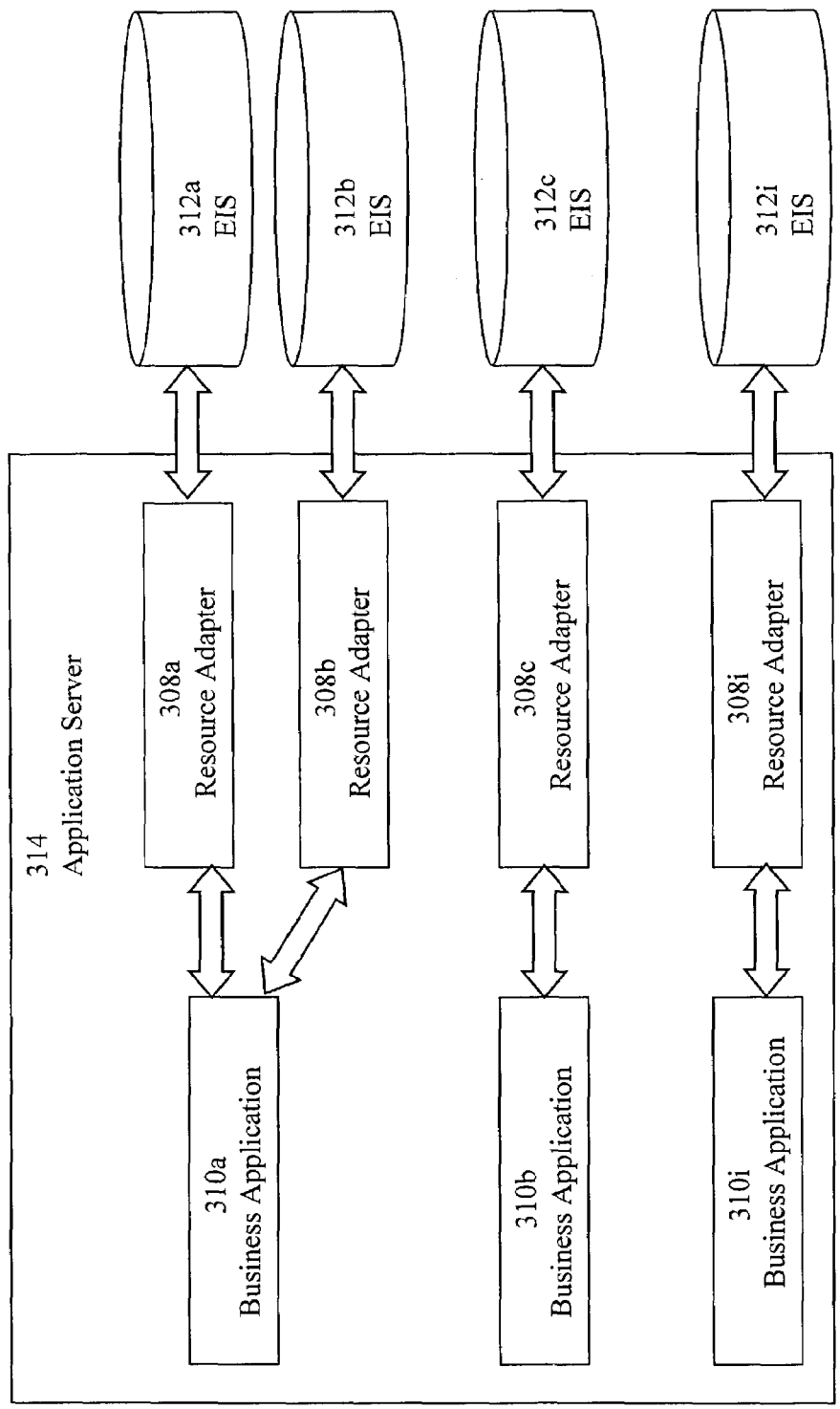
FIG. 6 illustrates a second interaction of some of the components of FIG. 2 during the operation of business applications developed employing aspects of the present invention.

With reference to FIG. 6, the interaction of some of the components shown in FIG. 3 is schematically illustrated. As indicated by FIG. 5, each RTA 308 is associated with a selected EIS 312. In FIG. 5, business application 31 0a is being developed (through the development facilities of IDE 306) that requires use of the services of two EISs: EIS 312a and EIS 312b. To generate the source code necessary to access the services of EISs 312a, 312b, two corresponding RTAs 308a, 308b are plugged into IDE 306. By plugging RTAs, IDE 306 is provided data describing the services available from the EIS 312 associated with a particular RTA 308 (i.e., IDE 306 will be provided data describing the services of EIS 312a by associated RTA 308a; RTA 308b will similarly provide data describing the services of EIS 312b to IDE 306). Through this information received from RTAs 308a, 308b, IDE 306 is able to assist in the generation of business application 310a which, during runtime, will use the services of EISs 312a, 312b. It is to be noted that while business application 310a is shown as being in communication with RTAs 308a and 308b (illustrated by way of a dashed arrow), in the exemplary embodiment there is no direct communication between a business application 310 under development and a RTA. Rather, the dashed arrows are used to illustrate that there is indirect communication between a business application 310 under development and one or more RTAS 308 (this indirect communication provided through the communication between IDE 306 and RTAS 308). In fact, only during runtime is a business application 310 aware of the existence of a RTA 308. The development process described above can also be separated in time. The import function to acquire the description of the EIS services (WSDL and XML Schema (XSD)) can be performed first and separately. The resulting WSDL and XSD files can then be used at a later point to compose a business application.

During development and in the exemplary embodiment, a RTA 308 provides an import service comprising two primary functions as described in a WSDL document for the RTA which functions are invoked by IDE 306. The two functions are invoked to ascertain the services provided by an associated or corresponding EIS 312 and how to use or invoke these services, providing, in the exemplary embodiment, the only source of information for obtaining data describing the services of an EIS 312 during the development of a business application 310. The WSDL document which forms part of each RTA 308 in the exemplary embodiment, is created prior to a RTA 308 being plugged into IDE 306. Using the functions provided by RTA 308, communication with EIS 312 will be initiated by RTA 308 to retrieve a list of the services provided by the EIS 312 and a description of those services. In the exemplary embodiment the list of services is a simple character string but other formats (e.g., arrays, XML documents, etc.) could equally be employed. A description for each of the services listed is, in the exemplary embodiment, provided by RTA 308 to IDE 306 in the form of a single WSDL document (although other data formats could equally be employed) describing all of the services. However, it is contemplated that a single document (whether in the form of WSDL documents or documents conforming to a different standard) each describing only a single service could also be employed. In this case, IDE 306 would be provided with one or more documents describing the services of EIS 312.

Other methods of providing the list of services provided by EIS 312 and description of those services listed may be employed. For example, RTA 308 may include data which lists the services. This data, which forms part of RTA 308 prior to RTA 308 being plugged into IDE 306, may be accessed by the IDE 306. A description of the services listed may then require communication with EIS 312. In a variation to this described alternative, the list of services provided by EIS 312, which forms part of RTA 308 may be updated by communication with EIS 312. In a further alternative, both the list of services provided by EIS 312 and a description of those services may form part of RTA 308. Invoking the functions of RTA 308 could then return the list and description to IDE 306. In a variation to the further alternative described above, the list of services and description of these same services could be updated by communication with EIS 312.

Also shown in FIG. 5 is business application 310b which is also created through the facilities of IDE 306. In the case of application 310b, access to the services provided by EIS 312c is described to IDE 306 by a RTA 308 associated (or designed to interact) with EIS 312c (namely, RTA 308c). The information obtained from RTA 308c is used by IDE 306 to assist in the development of application 310b.

FIG. 6 illustrates an exemplary runtime environment which embodies aspects of the present invention. As shown, application server 314 hosts RTAs 308a, 308b, 308c, . . . , 308i. Each RTA 308 facilitates communication between a corresponding EIS 312 and at least one business application 310. A single business application 310 may communicate with one or more RTAS 308. For example, business application 310a is shown communicating with two EISs 312 (namely EIS 312a and 312b) via corresponding RTAs 308a, 308b. Similarly, business applications 310b and 310i communicate with EISs 312c and 312i, respectively, through operation of RTAs 308c and 308i, respectively. A single adapter 308 could also be used simultaneously by more than one business application 310 (although this is not illustrated).

Figure 7:
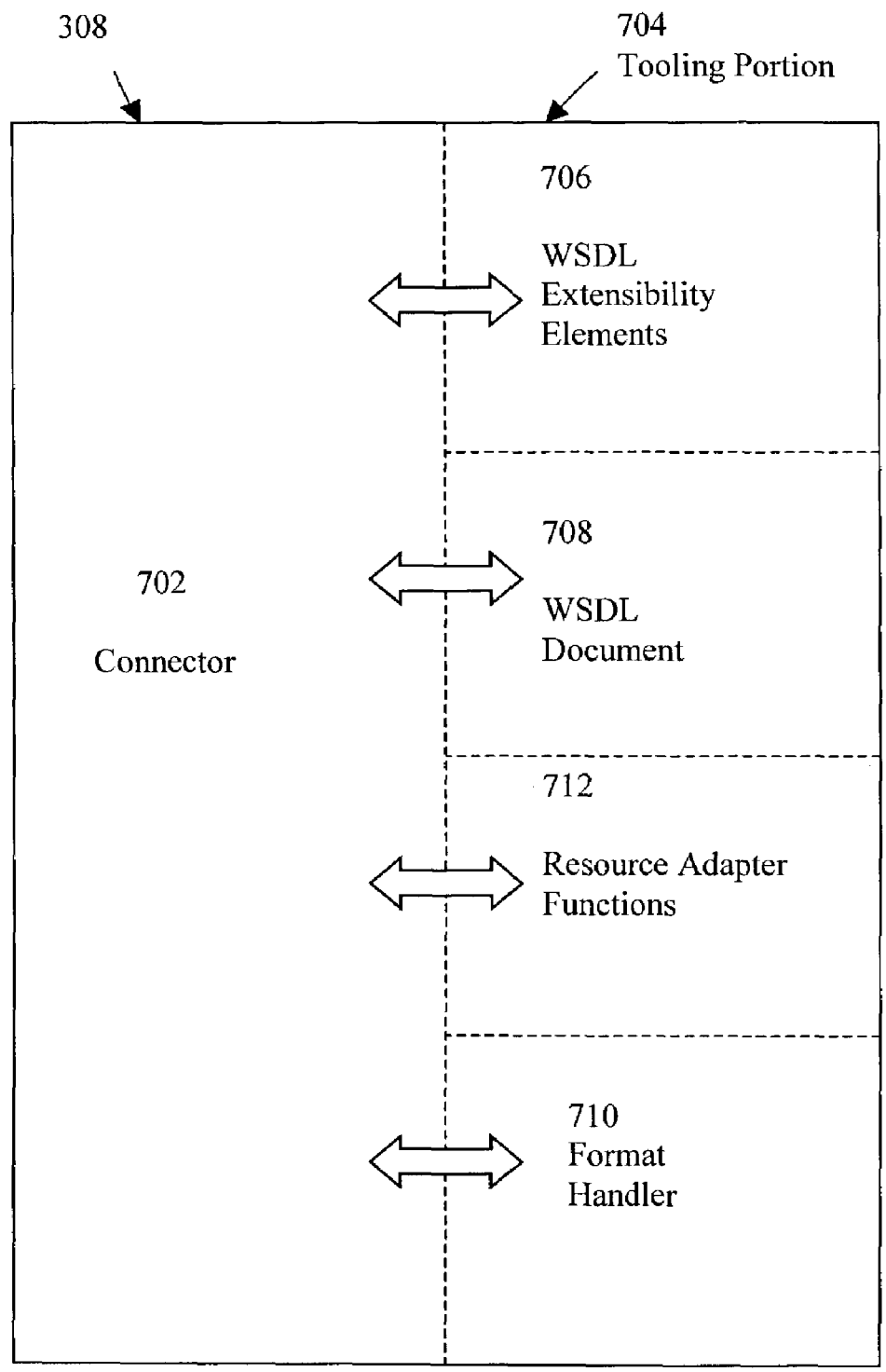
FIG. 7 illustrates, in greater detail and in functional block form, a portion of FIG. 3.

An exemplary RTA 308 is illustrated in greater detail in FIG. 7. As shown, RTA 308 includes a connector portion 702 combined with RTA tooling portion 704. The tooling portion 704 includes RTA functions 712 and a format handler generator 710. The WSDL document(s) 708 and extensibility elements 706 are in the exemplary embodiment retrieved or created as a result of interaction between RTA 308 and IDE 306.

In the exemplary embodiment connector portion 702 is embodied in a J2EE connector. As a cursory overview a J2EE connector includes the following: a Connection element and an interactive element which includes an Interaction and an InteractionSpec element. The Connection element operates to create connections between a business application on an application server (e.g., application server 314) and a connector 702. The interactive elements (Interaction and InteractionSpec elements) provide the mechanism to drive an interaction with EIS 312. The Interaction element enables the execution of specific EIS functions. In the J2EE architecture, the Interaction element includes an execute method that takes an input record, an output record and an InteractionSpec element. The execute method executes the EIS function represented by the InteractionSpec element. The InteractionSpec element holds properties of the interaction. Resource adapter 308 facilitates the communicating entites, namely the business application 310 and EIS 312.

The extensibility elements 706 extend the definition of the base elements (e.g. port, operation, input and output messages) in the WSDL document for the EIS. That is, the definitions of these base elements are extended with details which are used to map between the functionality of the connector 702 (which is, in the exemplary embodiment, a J2EE connector) and the services which are abstractly defined by the abstract services information document 708. The mapping between the J2EE connector artifacts and the elements 706 are indicated in Table I below.

TABLE I

| J2EE Connector Element | WSDL Elements |
| --- | --- |
| Connection | Port |
| Interaction | Operation |
| InteractionSpec | operation binding |
| Record | input message |
| Record | output message |

In many cases it is desirable to further extend the input and/or output messages to enable a format mechanism that defines the mapping or translation of the messages into the data type of the underlying EIS system as discussed further herein below in accordance with the invention.

Binding, in WSDL, refers to a process associating a protocol or data format information with an abstract entity like a message, operation, or port. Exemplary pseudo-code (in Extensible Markup Language—XML) is shown below in which the connector and format bindings are emphasized:

```
<definitions .... >
  <binding ...>
    <connector:binding />
    format:typeMapping encoding="..." style="...">
      <format:typeMap
        typeName="..."
```

-continued

```
        formatType="..." /> *
    </format:typeMapping>
    <operation .... >
      <connector:operation functionName="name"...
        interaction attributes ... />
      <input>
        ...
      </input>
      <output>
        ...
      </output>
    </operation>
  </binding>
  <port .... >
    <connector:address hostName="uri" portNumber="..."
      ...connection attributes ... />
  </port>
</definitions>
```

As will be appreciated by those of ordinary skill in the art, the namespace, and its identifier, should be defined in an earlier section of the WSDL document. Recall may be had to FIG. 4b which shows an exemplary connector WSDL sample document in accordance with the exemplary pseudo-code format provided above.

The connector:binding structure signifies that the binding is bound to a selected connector (in the exemplary embodiment connector 702 which is embodied by a J2EE connector architecture-based connector). The identifier connector is the short name for the namespace that identifies a particular connector. For example, the code <cics:binding . . . />identifies the connector 702 as being a RTA for a Customer Information Control System (CICS)—an EIS 312. The connector:binding structure may optionally contain InteractionSpec attributes that are valid for the operations bound to a selected port. It is understood that types of service providers other than connectors may be described in this manner. For example, a Java based provider (EJB or Java Bean) may implement the abstract service interface to which the binding relates.

The connector:operation structure contains the InteractionSpec attributes so that an operation on the EIS 312 can be executed. For example, the following code binds the function GETCUST on the EIS 312 (aCICS server):

```
<cics:operation functionName="GETCUST"/>
```

The connector:address structure contains the ManagedConnectionFactory attributes so that a connection factory (which forms part of the Connection elements described above) can be appropriately configured. The following pseudo-code is exemplary of setting the URL and name of a CICS server (an EIS 312):

```
<cics:address connectionURL="..." serverName="..."/>
```

In accordance with an aspect of the invention, a format binding contains meta data providing information for the conversion between native format types used by the EIS and Java types used by the RTA 308. A format:typeMapping structure as shown above identifies an encoding and optional style differentiator for the native data types understood by the EIS. The format bindings are used at runtime and at tool time, and such use may vary in accordance with the type of service provider (i.e. the implementation of the abstract service interface). In an EIS type provider (i.e. connector binding), the format binding is used at tool time to generate an appropriate format handler as described further below. At runtime, the meat information (e.g. binding short name and encoding) are used to derive the name of the format handler class. For a Java provider, the format binding is used to determine the types of arguments at runtime. The typeMapping structure encloses a format:typeMap structure which associates the logical data format (i.e. XML Schema (XSD) used to define the abstract service interface) with the EIS native format. The native format is identified by a formatType identifier. The format binding framework does not make any assumption about the value of the formatType string and the service implementor can set it to an arbitrary value. The framework only associates this formatType string with the particular XSD type. Also, the service implementor is the only consumer of the formatType (either at tool time or at runtime).

FIG. 4b shows the COBOL native format 452 described by the typeMap framework of the present invention as reproduced below:

```
<format:typeMapping encoding="COBOL" style="COBOL" >
    <format:typeMap
        typename="Customer"
        formatType = "CustomerInfo.ccp:CUSTINF"/>
    </format:typeMapping>
```

The abstract services information document 708 (which in the exemplary embodiment is a WSDL document) provides an abstract description of the services provided by an associated EIS 312. Hereinafter the abstract services information document 708 will be referred to as the WSDL document 708 for ease of reference.

RTA functions 712 (hereinafter functions 712) are described in a WSDL document (although other languages could equally be employed). Functions 712 are two functions or methods which can be invoked: FindService and GetAbstractServiceInformationDocuments (which in the exemplary embodiment is renamed GetWSDLDocuments).

The first function, FindService (which persons of ordinary skill in the art is simply an exemplary function name), is used by an IDE 306 to query the names of all the functions (or services or operations (portTypes in WSDL)—collectively "services") offered by a particular EIS 312. The FindService function is used so that client code can be created which can access the services identified by the calling of the FindService function. As such, the FindService function is used by an IDE 306 as a mechanism to identify the set of possible services for which code can be created. The FindService function, when invoked by an IDE 306 causes RTA 308, in the exemplary embodiment, to establish communication with its associated EIS 312. Once communication has been established, RTA 308 will query EIS 312 to determine the services provided by the EIS 312. Once determined, RTA 308 will return a list of the services to IDE 306. The list of services is provided to IDE 306, in the exemplary embodiment, in the form of an array of portTypes. However, other data formats (e.g., character string, XML documents, etc.) could alternatively be employed.

The second function, GetWSDLDocuments in the exemplary embodiment, is used by an IDE 306 to retrieve the service definitions (i.e. descriptions) for a particular portType function identified using the FindService function. These descriptions provide the necessary information (including the connector bindings) such that an IDE 306 can generate the necessary code (forming part of a business application 310) to interact with the service provided by an EIS. In the exemplary embodiment, for each selected portType, a single WSDL definition document and an array of XML Schema for complex types used in the definition are returned to IDE 306. Collectively the WSDL documents and Schema returned by GetWSDLDocuments form the WSDL document 708 (FIG. 7). As will be appreciated, other data formats (e.g., using a different description language, returning one document for all services returned by FindService) could be employed in alternative embodiments.

It should be noted that while these two functions (FindService and GetWSDLDocuments) are described in the exemplary embodiments as being implemented internally as part of a RTA 308, these two functions could, in an alternative embodiment, be implemented by an EIS 312, or implemented in some other repository. However, providing the functions 712 as part of a RTA 308 ensures that an IDE 306 has a simple mechanism to identify where, and how, to access the services provided by an EIS 312 since the functions and the information the functions access (stored as part of the WSDL document 708) and extension elements 706 are, ultimately, packaged as part of a RTA 308.

At runtime, messages (e.g. input, output, fault) get exchanged between the provider of the EIS service and a component of the business application requiring the service (i.e. a service client) in accordance with the abstract service interface. As described earlier with reference to FIGS. 4a and 4b, messages consist of typed parts. In order for the provider of the EIS service to understand the message, the invocation runtime has to transform the parts into the provider's native format. Format handling is about marshalling the Java representation of a data structure described by XML Schema to or from its binding dependent native format. Separating the Java representation and format handling enables late binding, and prevents the service client logic from using objects that are binding specific.

Figure 8:
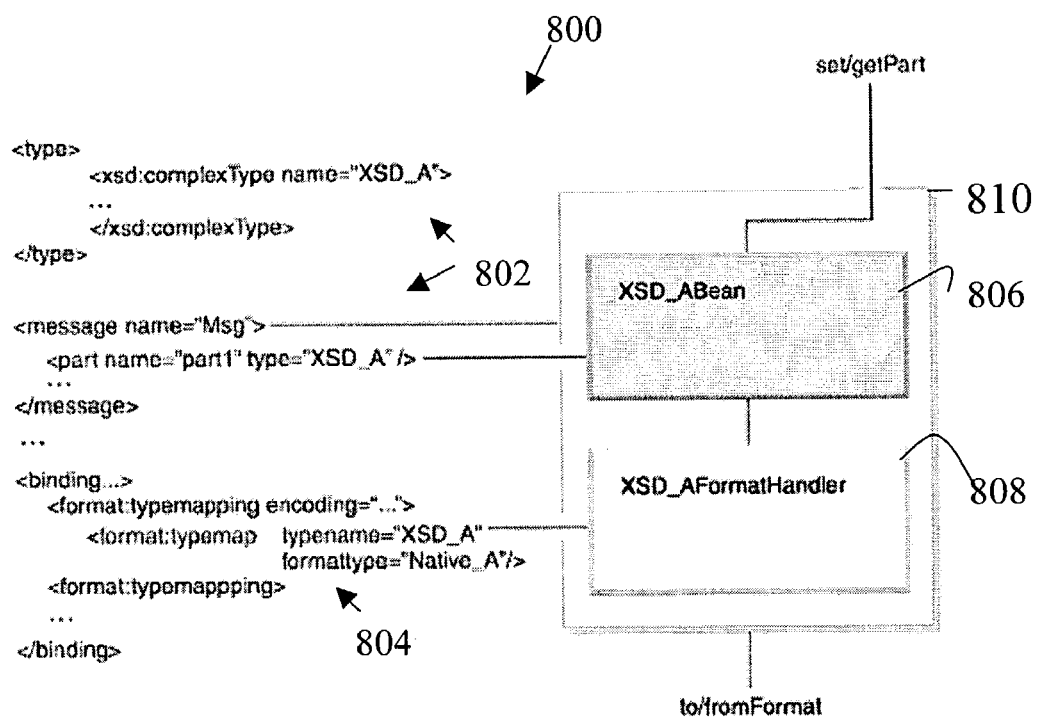
FIG. 8 illustrates a portion of the memory of FIG. 7 in greater detail.

With reference again to FIG. 4b and the exemplary pseudo-code set forth above, in accordance with an aspect of the invention there is provided a binding section structure which defines type mappings to map XML Schema types to respective native types. Given this meta information from the WSDL 708, RTA 308 can generate runtime elements for handling specific data formatting needs. FIG. 8 illustrates the relationship 800 between exemplary WSDL elements 802 and 804 providing the meta data and runtime elements 806 and 808 of a message implementation 810. Runtime element 806 of the message implementation 810 for the message "msg" is a Java bean providing a Java representation of the data structure XSD_A described by the XML Schema 802 extracted from an abstract service interface definition. Java bean 806 corresponds to the message part (part name="part1", type="XSD_A"). Java Bean 806 permits manipulation of "msg" without regard for the native data type of the EIS implementation. The other runtime element 808 is a FormatHandler which is generated based on the format: typeMapping 804 for the typename XSD_A obtained from a service implementation definition.

Format handler generator 710 (FIG. 7) provides a mechanism that can be used by IDE 306 to generate code, such as elements 806 and 808, for handling the data formats employed by the EIS 312 and the business application 310 which is designed to use the services of the EIS 312. As will be appreciated, format handler generator 710 need not form part of RTA 308 but could, in alternative embodiments, be provided by another repository (i.e., be separated from RTA 308).

In order for a message implementation (i.e. the runtime component implementing the message element of the abstract service interface) to deal with its data in its native format, the implementation uses a format handler for each of the part types of the message for which the implementation was factored. A message implementation determines which format handlers to use for the parts of its message in accordance with the meta information of the concrete message for which it was factored. Message types are defined in association with qualifying names in WSDL (e.g. namespace and localname). As such, a rule or naming convention for constructing a format handler name may be adopted. In accordance with a preference of the present embodiment the name of the format handler is determined in accordance with the following convention:

<reversed xsd typenamespace>.<binding shortname>.<format encoding+style>.<xsd typelocalname>"FormatHandler"

IDE 306 can provide a utility class having functions or methods that can be used in the message implementation as well as in the implementation of the format handler generator for obtaining and manipulating the naming variables to use in accordance with the above convention.

To support various EIS native formats, RTA 308 provides a format handler generator interface which, when implemented, generates format handlers (e.g. 808) specific to the binding, encoding, style and xsd type (i.e. typename). An exemplary Java code interface is as follows:

```
package ...formathandler;
public interface FormatHandlerGenerator {
    public java.util.Hashtable generate(
        String generationPackage,
        String beanClass,
        javax.wsdl.Definition aDefinition,
        javax.wsdl.Binding aBinding,
        String anEncoding,
        String aStyle,
        javax.wsdl.QName xsdQname,
        int elementType);
    public final static int XSD_TYPE =0;
    public final static int XSD_ELEMENT =1;
}
```

The arguments to the generate method are as follows:

generationPackage—the fully qualified package that the generator should use to generate its classes in. The package name is derived from the XSD type name, binding and format binding, using a convention such as the algorithm already described;

beanClass—the fully qualified name of the Java bean class that represents the XSD type (or element) for which a format handler is being generated. The format handler may need to use the class name (for example to instantiate and return the object of this class).

aDefinition—the WSDL definition from which the XSD type is derived.

aBinding—The WSDL binding element that contains the type mapping for the XSD type that is being used. The Format Handler Generator can retrieve from the binding element the typeMap string value for the XSD it generates and use it in the generated code. For example for Java bindings, the typeMap contains the class name corresponding to the particular XSD type. The native format for a Java binding is an array of Class objects corresponding to the method arguments and the typeMap can be used to derive it. In general, the framework does not know or care what is in the format typeMap and how it is used. The service provider implements and uses it;

anEncoding—The encoding attribute off the TypeMapping element associated with the format handler to be generated. This and the next argument determine the actual format of the data;

aStyle—The style attribute off the TypeMapping element associated with the format handler to be generated;

xsdQname—The QName of the XSD) element (or type) for which the format handler is being generated;

elementType—The type of element represented by the xsdQname parameter. This is either CustomFormatHandlerGenerator.XSD_TYPE or CustomFormatHandlerGenerator.XSD_ELEMENT. The format handler generator needs this information for it influences the name of the format handler implementation, for the xsd element "Customer", the format handler name would be "CustomerElementFormatHandler".

The method returns a HashTable that contains a set of InputStreams. Each input stream contains the generated code for a particular class generated by the format handler generator. The number of input streams returned depends on the number of classes that are generated by the format handler generator. The keys of the HashTable are the name of each class (unqualified) that is represented by its corresponding InputStream value. The class name keys are unqualified because they are all in the generationPackage that is passed in as an input parameter.

The generated format handlers are implemented with a general interface containing methods used to set or retrieve fields of the associated Java bean representing XSD type (get/set Element) and methods to set and retrieve the complete Java Bean of the corresponding type. In addition, each format handler implements a "native" interface i.e. the interface that allows the caller to set or retrieve the native representation of the data. RTA 308 may contain several "native" format handler interfaces, such as:

JCAFormatHander:

package com.ibm.wsifjca;

public interface JCAFormatHandler extends com.ibm.wsif.format.WSIFFormatHandler { public void read(java.io.InputStream inputStream) throws java.io.IOException;

public void write(java.io.OutputStream outputStream) throws java.io.IOException;

}

In the above case, the reado and write( ) methods are used to retrieve and set the native (wire) format, matching the Streamable interface of the J2EE Connector Architecture specification.

```
Part Format Handler:
package com.ibm.wsif.format.literal;
public interface PartFormatHandler {
    public void setElement(org.w3c.dom.Element element);
    public org.w3c.dom.Element getElement( );
    public void setObjectPart(Object customBean);
    public Object getObjectPart( );
    public void setPartQName(javax.wsdl.QName qName);
    public javax.wsdl.QName getPartQName( );
}
```

The getElement and setElement are used to produce consume the native format (DOM Element) in the literal format handler.

To invoke a service on EIS 312 using a RTA 308 the exemplary embodiment requires certain data (or metadata): the connection properties so that the connector 702 (using the ManagedConnectionFactory interface) can be used to create a physical connection to the EIS 312 associated with the RTA 308; the interaction properties to be used with the Interaction Spec element of the connector 702; the Record to be used and its structure to communicate with an EIS 312; and the operation offered by the EIS 312.

As noted above by Table I, there is a binding, association or mapping between services associated with the EIS 312 and the corresponding portions of the connector 702 (which, in the exemplary embodiment, is a J2EE connector). The exemplary binding between input and output messages and the Streamable.write and Streamable.read, respectively, provides the link between messages sent to an EIS 312 and messages returned by the EIS 312. As will be appreciated by those of ordinary skill in the art, the structure of the messages and their associate format must be ensured so that an EIS 312 can interpret messages received from a RTA 308. Similarly, messages from an EIS 312 to a business application 310 need to be formatted and structured in a manner which can be interpreted by the business application. This conversion between formats is handled by a format handler generated using the functionality provided by format handler generator 710.

Figure 9A:
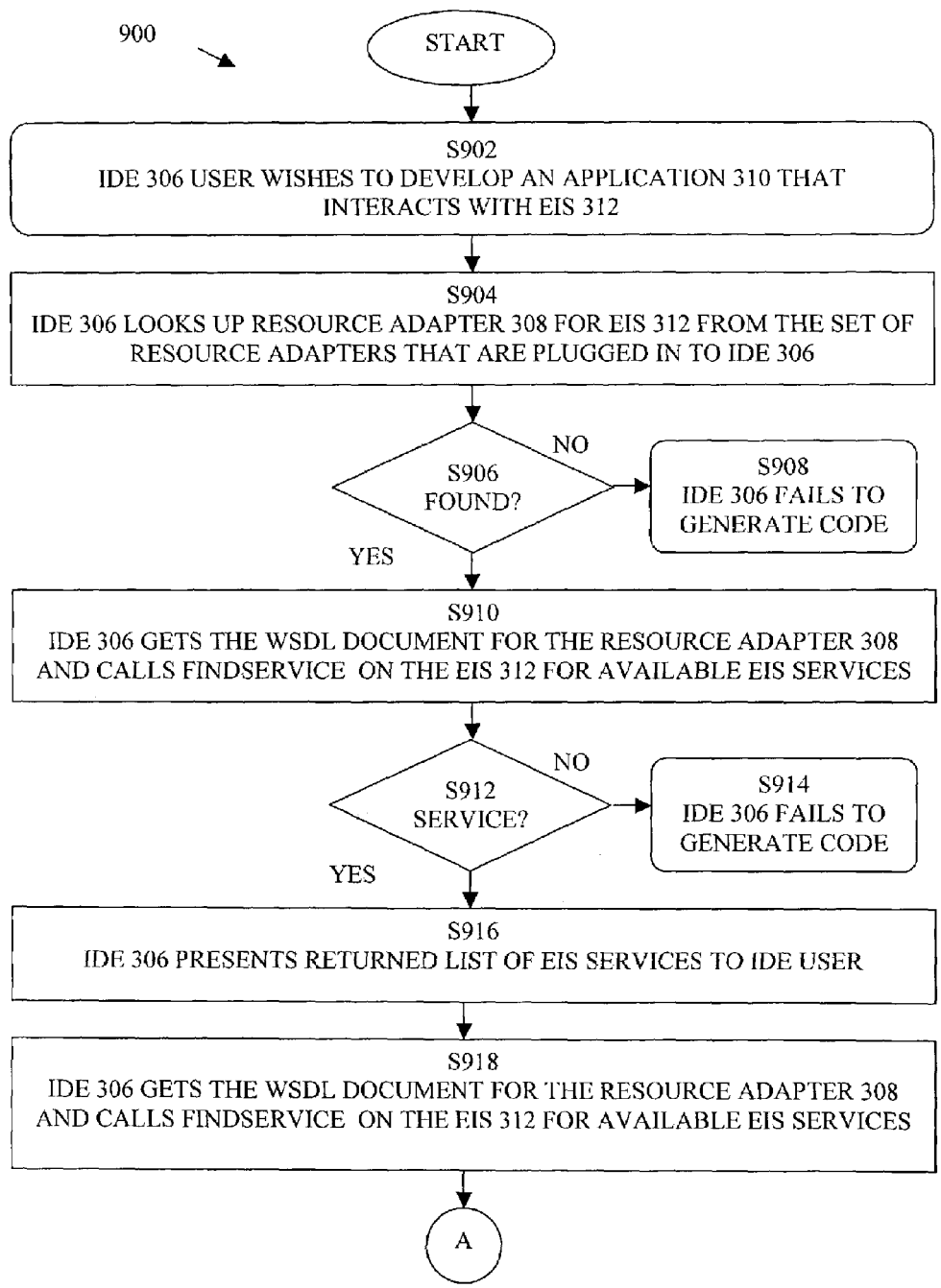
FIGS. 9a and b illustrate an exemplary flow chart of operations performed during the development of a business application illustrated in FIG. 5.
Figure 9B:
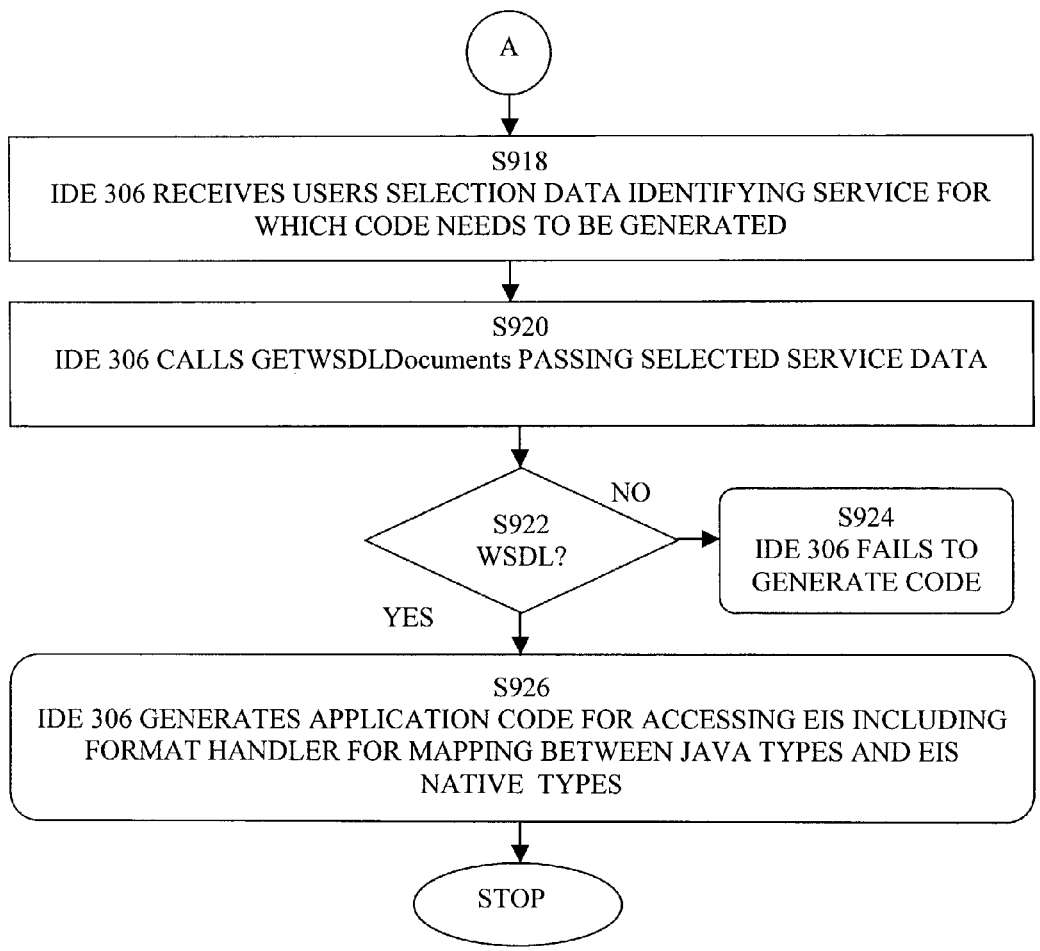

The operations of IDE 306, RTAs 308 (and the components thereof, a business application 310, an EIS 312 may be better understood with reference to the operations illustrated in FIGS. 9a and 9b. Operations 900 are performed during the creation of a business application 310 designed to interact with an EIS 312. The creation of business application 310 will be created through the operation and interaction between IDE 306 and a RTA 308. The created business application 310 will, during runtime, use the same RTA 308 (and, more particularly, the connector portion 702) to use the services of an EIS 312.

Initially, IDE 306 receives data indicating that the business application 310 being developed by a user requires interaction with various services provided by a selected EIS 312 (S902). The data received may be provided through mouse clicks or other means of data entry. Responsive to the received request, IDE 306 attempts to locate whether a RTA for the selected EIS 312 is available (S904). Such a determination may be made by accessing a lookup table or querying a repository which identifies those RTAS 308 which have been "plugged" into the IDE 306. If the required RTA 308 (determined by the search performed in S904 based on the identity of the selected EIS 312) is not available (S906), IDE 306 is unable to generate the code required (S908). In such an instance, the user of IDE 306 may be provided a warning message and, in some embodiments, prompted to provide a RTA308 (or the location of such) which is adapted to interact with the selected EIS 312.

If, however, IDE 306 locates in S904/S906 that the required RTA 308 is available, a query is transmitted to the RTA 308 requesting identification of the services which are provided by the EIS 312 with which the RTA is associated (S910). Responsive to this request to RTA 308, RTA calls the FindService function (which forms part of functions 712—FIG. 7). IDE 306 uses the RTA's WSDL document to invoke the FindService function of RTA 308. The WSDL document provides the information necessary to IDE 306 to invoke this function. In the exemplary embodiment each RTA 308 implements the FindService function internally. However, the FindService function, in alternative embodiments, could be delegated to the associated EIS 312 or some other repository. (As noted above, alternative embodiments may update or generate WSDL document 708 responsive to a request for identification of services received from IDE 306. These alternative embodiments may involve RTA 308 communicating with EIS 312 to update WSDL document 708.)

If RTA 308, responsive to a request received (S910) returns a null list of service or fails to respond (S912), IDE 306 will be unable to assist in generating code for application 310 (S914). However, if a list of services provided by EIS 312 is successfully returned by RTA 308 (as a result of communication with EIS 312) to IDE 306, IDE 306 is able to present to a user the identities of these services (S916). By way of example, RTA 306 may provided a CICS connector as set forth in the WSDL of FIG. 4b. The services (e.g. CustomerInfoPortType) may be presented using the GUI of IDE 306 in a manner known to those of ordinary skill in the art (e.g., in a pane, separate window, as a drop down list, etc.).

Responsive to the services presented to a user (or at some later point in time), IDE 306 may receive data indicative of a user's selection of (i.e., desire to use) one or more of the services offered by the EIS 312 and presented to the user in S916 (S918). The received user selection data may be in any known form (e.g., mouse clicks, data entry, or the like).

On receipt of the user selection data (S918), IDE 306 will invoke the GetWSDLDocuments function (a portion of functions 712) of the RTA 308 (S920, FIG. 9b). If the invocation of the GetWSDLDocuments is unsuccessful (e.g., no WSDL documents 708 are returned, IDE 306 receives no response, etc.) (S922), IDE 306 will be unable to assist a user in generating code for a business application 310 which utilizes the functions selected in S918 (S924). If there is such a failure, IDE 306 may inform a user through the display of an error message, warning or the like.

However, if a WSDL document(s) 708 such as illustrated in FIG. 4b is returned (as a result of communication between RTA 308 and EIS 312), IDE 306 will (having mapped the connector 702 elements to the extensibility elements 706) then be able to generate code for business application 310 which accesses the services provided by EIS 312. Particularly, format handler generator 710 can generate code for a format handler.

With reference to the sample WSDL of FIG. 4a, the CICS resource adapter connects to the CICS system and exchanges customer information. The information is described as an XSD complextype "Customer" in the namespace http://customer.ibm.com/. The target service is described as having cics bindings with the encoding (and optional style) of "cobol". RTA 308 generates a "com.ibm.customer.Customer" class, representing the XSD type Customer, and a com.ibm.customer.cics.cobolcobol.CustomerFornatHandler, a format handler for this type. Optionally, IDE 306 may also generate a service proxy to simplify the invocation of the service (not illustrated).

As will be appreciated by those of ordinary skill in the art, IDE 306 may have, serially or simultaneously, more than one RTA 308 "plugged in" during the creation of a business application 310.

Figure 10:
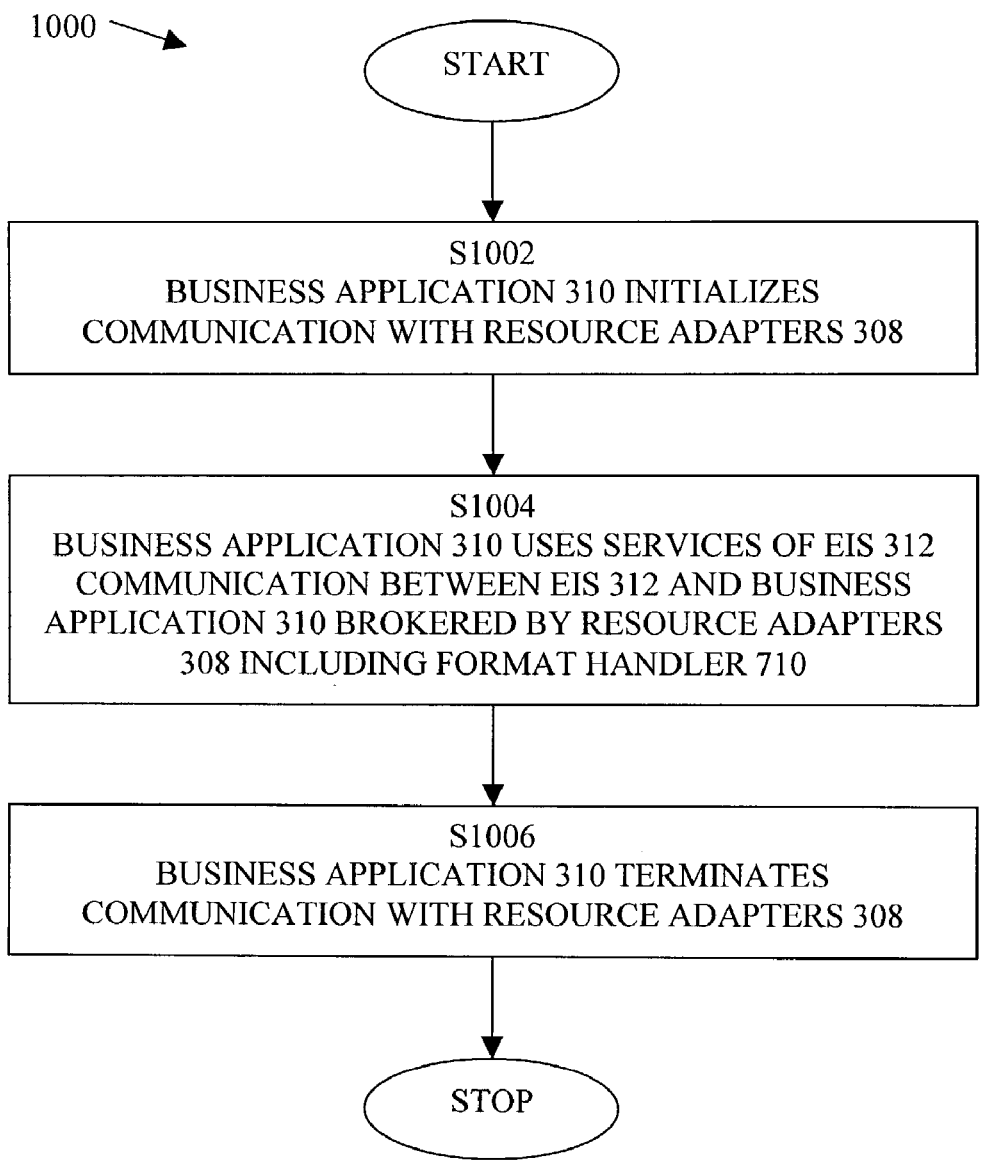
FIG. 10 illustrates a flow chart of operations performed during the execution a business application.

Operations 1000 shown in flow chart form in FIG. 10, illustrate the operations performed during the runtime of a business application 310 developed using IDE 306 and a RTA 308. During execution (or during initialization) business application 310 will establish communication with RTA 308 (which is hosted application server 314—FIG. 5) (S1002). During operation S1002 (and the remainder of operations 1000) business application 310 will only communicate with RTA 308 using the facilities provided by the connector portion 702 (i.e., the functionality provided by RTA enhancements 704 are not employed during operations 1000). After communication between RTA 308 and business application 310 has been established (S1002), requests for services from EIS 312 made by business application 310 will be brokered by the operation of RTA 308 (S1004).

By way of example, format handling operations of an RTA 308 may be understood with reference to the service described by the WSDL of FIG. 4b and the code generated as described above with reference to the operations illustrated by FIG. 9. In a service proxy for the use of the services of the exemplary CICS connector, the proxy instantiates Customer, (from "com.ibm.customer.Customer" class) sets the customer number and invokes the service using the connector interface. The Message (input message) passed to the RTA 308 for execution contains one part, the Customer object. This message (a StreamableMessage) is passed to a execute method of RTA 308 as an argument and RTA invokes its write method to retrieve the data to be sent to the connected CICS system. In the Message implementation, for each part of the message (Customer in this case), the format handler is found using JAX-RPC in accordance with the naming convention described above (i.e. com.ibm.customer.cics.cobolcobol.CustomerFormat Handler). The Customer object is set on the format handler using the generic interface method setObjectPart( ) described above and the format handler's write( ) method is invoked. In its implementation, the format handler retrieves all the events (delayed sets) from each message part and then marshals it into the COBOL wire (i.e. transfer) format.

The contract between a Format Handler and a message invoking it is specific to the message type, the target system type and the service destination. The "write( )" and "reado" methods, for example, define the contract between the JCAMessage and the Format Handler of the resource adapter that uses the Streamable interface. When the Resource Adapter invokes the write( ) method of the JCAMessage, the message can, after finding the appropriate Format Handler (as described above), invoke its writeo method, passing the OutputStream it received, as an argument, from the Resource Adapter. This approach may be applied to the reado method as well. In this approach, the same method (writeo or reado, respectively) is defined on the message and on the Format Handler interface, simplifying the approach to the use of format handlers.

The wire format should be understood as a specific format of data that allows the target service to be executed. In other words, it is the representation of arguments or results understandable to the target service. In the Streamable Resource Adapter case, this format is a sequence of data that can be written to and read from a stream. A different type of resource adapter may be implemented to support an array of bytes Oava type byte[]). The wire format however is not limited to a representation that can be exchanged over the network of computer systems (a literal wire format). For example if the target service is a Java based service, the wire or native format is an array of objects of the "Class" type that represents classes of arguments necessary to be passed to invoke the target method of the Java class.

With reference again to the exemplary transaction. on the return from the CICS system, the StreamableMessage read method is invoked. The message locates the format handler for the part or parts (that do not need to be set on the output Message) and invokes its read method. Upon completion, the format handler has the data in the native format (only). This delays the conversion from the "native" format to Java bean format until necessary. At a later point, the service client proxy asks the Message returned from the service execution for the Customer part. Only then, the JCAMessage asks the format handler to create the appropriate part (using the generic interface's getObjectPart method). Even at this point, there is no data conversion. The format handler created the new Java bean representation of the native data, however it did not populate it. Only when the value of the particular field is retrieved, the conversion takes place.

When the services of EIS 312 are no longer required by business application 310, communication with RTA 308 may be terminated (S1006). Such a termination may occur, for example, during the continued execution of business application 310 or during a process to terminate execution of business application 310.

As will be appreciated by those of ordinary skill in the art, any business application (regardless of whether created through use of IDE 306 or a conventional IDE (i.e., an IDE that does not leverage the inventive aspects of RTA 308 but rather uses a conventional adapter tool to create code to access an EIS)) could also be used in place of business application 310. Similarly, a business application designed to employ a RTA, could use either a RTA 308 (embodying aspects of the present invention) or a connector 702 only.

As will be appreciated by those skilled in the art, modifications to the above-described embodiment can be made without departing from the essence of the invention. For example, the enhancements portion 704 (FIG. 7) of RTA 308 could be separated from the connector portion 702. In this embodiment, only portion 704 need be "plugged" into IDE 306 during development. However, unlike the adapter-tool sets described above, the enhancements portion 704 would be responsible for communicating with its corresponding connector 702 that may be deployed on some other system. In a further alternative, the two RTA functions described above, FindService and GetWSDLDocuments, could be combined into a single function. Alternatively, the two functions could be called simultaneously or serially (i.e., without other intervening actions).

The framework for format handling has been described in accordance with a static support approach, generating artifacts such as Java Beans corresponding to the XSD types and appropriate format handlers at tooltime for use during runtime. A dynamic approach may also be taken whereby artifacts are not created at tooltime, before the invocation of the service. In contrast, at runtime, the WSDL bindings and XML Schema describing the service interface are used by a format handler factory implemented, for example, by the service provider to create the artifacts, such as an instance of the format handler object in memory, (possibly persisted) which artifacts thereafter may be discarded. Besides being able to handle a bean derived from the XSD Schema type, the format handler can in addition also support instance of the XSD Schema type in form of a DOMSource or SAXSource. This allows for direct usage of XML in a service invocation, if preferred.

While format mapping is described with reference to COBOL native types in a resource adapter context, other native data types including Java types may be mapped using the techniques described herein. Format handlers and Java Beans for the abstract types may be generated for services other than resource adapted services. Such services may include Java Beans or EJBs described by WSDL documents for providing as services (e.g. Web Services) in a business application. Such services may be developed by an IDE adapted to generate the format mapping runtime artifacts described herein. Alternatively such artifacts may be coded in accordance with other assisted and manual coding techniques.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method executing within a computer system for generating code for a business application, said code adapted to access a service provided by a service implementation created from code in a native language, said method comprising:

receiving data describing said service and service implementation, said data describing one or more messages associated with said service and information to identify one or more native data types of said service implementation implementing said messages;

mapping said data describing said messages to corresponding native data types of said implementation; and generating code of said business application, said code implementing said mapping.

2. The method of claim 1 wherein generating code comprises generating Java code defining each of said messages as Java data types for manipulating said messages without regard for the native data types of said implementation.

3. The method of claim 1 wherein generating code comprises generating a respective format handler for each of said messages, each said format handler for, at least one of, converting a respective message to and converting a respective message from said corresponding native data types.

4. The method of claim 1 wherein generating code comprises:

generating Java code defining each of said messages as Java data types for manipulating said messages without regard for the native data types of said implementation; and generating a respective format handler for each of said messages, each said format handler for, at least one of, converting a respective message to and converting a respective message from said corresponding native data types.

5. The method of claim 4 wherein said generating a format handler comprises naming said format handler in accordance with a naming convention to facilitate location of said format handler when said business application is executing.

6. The method of claim 5 wherein the naming convention is responsive to data describing the message and data describing said implementation of said messages.

7. The method of claim 1 wherein said information to identify one or more native data types comprises coding parameters including at least one of an encoding parameter indicative of the native language of the implementation and a style parameter indicative of a style of said native language and wherein said step of generating generates in response to the coding parameters.

8. The method of claim 1 wherein the data describing the service and implementation comprises Extensible Markup Language (XML) data.

9. The method of claim 8 wherein said XML data conforms to the Web Services Definition Language (WSDL) standard.

10. The method of claim 9 wherein said XML data is provided in at least one document.

11. The method of claim 1 wherein said receiving data describing said service and implementation comprises:

querying a resource and tooling adapter for said data describing said service and implementation; and responsive to said querying, receiving said data describing said service and implementation.

12. The method of claim 11 wherein said code generated is adapted to said resource and tooling adapter.

13. The method of claim 11 wherein said resource and tooling adapter comprises a connector and a document comprising said data describing said service and implementation.

14. The method of claim 13 wherein said connector is one of a Java 2, Enterprise Edition (J2EE) Connector Architecture connector; and a Common Connector Framework (CCF) connector.

15. The method of claim 1 wherein said steps of receiving, mapping and generating are performed dynamically, during the execution of said business application.

16. An integrated development environment (IDE) executing within a computer system for generating a business application, said business application, when executed, uses a service provided by a service implementation, said IDE comprising:

an interface for determining data describing said service and service implementation, said data describing one or more messages associated with said service and information to identify one or more native data types implementing said messages; and a generator generating code for said business application to access said service, said code mapping said data describing said messages to corresponding native data types of said implementation.

17. The IDE of claim 16 wherein the generator generating Java code defining each of said messages as Java data types for manipulating said messages without regard for the native data types of said implementation.

18. The IDE of claim 16 wherein said generator generating a respective format handler for each of said messages, each said format handler for, at least one of, converting a respective message to and converting a respective message from said corresponding native data types.

19. The IDE of claim 18 wherein generating a respective format handler comprises naming the format handler in accordance with a naming convention to facilitate location of the format handler when in operation.

20. The IDE of claim 16 wherein said generator generating Java code defining each of said messages as Java data types for manipulating said messages without regard for the native data types of said implementation; and generating a respective format handler for each of said messages, each said format handler for, at least one of, converting a respective message to and converting a respective message from said corresponding native data types.

21. The IDE of claim 16 wherein said information to identify one or more native data types comprises coding parameters including at least one of an encoding parameter indicative of the native language of the implementation and a style parameter indicative of a style of said native language and wherein said generator generates in response to the coding parameters.

22. The IDE of claim 19 wherein the naming convention is responsive to data describing the message and data describing the service implementation of said message.

23. The IDE of claim 16 wherein the interface comprising an interface for querying to and receiving a response from a resource and tooling adapter to ascertain a service provided by an enterprise information system (US) that defines the service implementation.

24. A computer readable storage media storing data and instructions readable by a computer system, said computer system executing an integrated development environment (IDE) for generating a business application to access a service provided by a service implementation, said data and instructions, when deployed on said computer system, adapts said IDE to:

determine data describing said service and service implementation, said data describing one or more messages associated with said service and information to identify one or more native data types implementing said messages; and using said data, generate code for said business application to access said service, said code mapping said data describing said messages to corresponding native data types of said service implementation.

25. A method executing within a computer system for generating components of a business application which accesses a service provided by a service implementation in accordance with a definition, the method comprising:

receiving a service interface definition providing an abstract description including at least one abstract data type for a service to be provided by the business application;

receiving a service implementation definition providing a description and location of an implementation of the service, said service implementation definition comprising format bindings providing a relationship between the at least one abstract data type and at least one corresponding native data type of the implementation;

generating Java based code defining Java types to provide a representation of the at least one abstract data type for manipulating without regard to a respective native type implementing the abstract type; and generating a format handler in response to said format bindings to map said Java types to said native types.

26. The method of claim 25 wherein at least one of the service interface definition and service implementation definition comprise a document.

27. The method of claim 26 wherein said document comprises an XML document.

28. The method of claim 27 wherein said XML document conforms to the WSDL standard.

29. The method of claim 25 wherein said service implementation definition comprises implementation bindings and wherein said step of generating a format handler generates in response to said implementation bindings.

30. The method of claim 25 wherein said format bindings comprise coding parameters comprising at least one of an encoding parameter indicative of the native language of the implementation and a style parameter indicative of a style of said native language and wherein said step of generating a format handler generates in response to said coding parameters.

* * * * *